(12) United States Patent
Lee et al.

(10) Patent No.: US 8,588,792 B2
(45) Date of Patent: Nov. 19, 2013

(54) CHANNEL-OCCUPANCY-STATUS BASED EARLY AVOIDANCE

(75) Inventors: Ki-Dong Lee, San Diego, CA (US);
Li-Hsiang Sun, San Diego, CA (US);
SungDuck Chun, San Diego, CA (US);
SungHoon Jung, San Diego, CA (US);
SeungJune Yi, San Diego, CA (US)

(73) Assignee: LG Electronics Inc., Seoul (KR)

( * ) Notice: Subject to any disclaimer, the term of this patent is extended or adjusted under 35 U.S.C. 154(b) by 167 days.

(21) Appl. No.: 12/900,439

(22) Filed: Oct. 7, 2010

(65) Prior Publication Data

US 2011/0086642 A1   Apr. 14, 2011

Related U.S. Application Data

(60) Provisional application No. 61/249,969, filed on Oct. 8, 2009, provisional application No. 61/355,507, filed on Jun. 16, 2010.

(51) Int. Cl.
*H04W 40/00* (2009.01)

(52) U.S. Cl.
USPC ............ 455/445; 455/404.1; 455/412.2; 455/414.1; 455/453; 370/229; 370/237; 370/242; 370/244; 370/395.2; 370/395.4; 370/431

(58) Field of Classification Search
USPC ............ 455/404.1, 412.2, 414.1, 445, 453; 370/229–231, 237, 242, 244, 395.2, 370/395.3, 395.4, 395.42, 431–434
See application file for complete search history.

(56) References Cited

U.S. PATENT DOCUMENTS

| | | | |
|---|---|---|---|
| 2006/0035662 A1* | 2/2006 | Jeong et al. | 455/525 |
| 2008/0239964 A1 | 10/2008 | Mitsutake | |
| 2009/0036127 A1* | 2/2009 | Kim | 455/435.2 |
| 2009/0239554 A1* | 9/2009 | Sammour et al. | 455/458 |
| 2009/0270104 A1* | 10/2009 | Du et al. | 455/436 |

FOREIGN PATENT DOCUMENTS

| KR | 1020050063611 | 6/2005 |
|---|---|---|
| KR | 1020080018264 | 2/2008 |

* cited by examiner

*Primary Examiner* — Meless N Zewdu
*Assistant Examiner* — Michael Nguyen
(74) *Attorney, Agent, or Firm* — Lee, Hong, Degerman, Kang & Waimey

(57) ABSTRACT

Method for reducing call initiation collisions in a wireless communication system includes determining, at an eNodeB, a need to reduce a number of call initiation requests arriving from a plurality of user equipment (UEs). One operation provides broadcasting, by the eNodeB, a notification message to the UEs responsive to the determining of the need to reduce the number of call initiation requests, the notification message including information for facilitating a determination of whether a receiving UE is permitted to transmit a call initiation request to the eNodeB. Another feature includes receiving, at the eNodeB, the call initiation request from one or more of the plurality of UEs that are determined to be permitted to transmit the call initiation request.

6 Claims, 10 Drawing Sheets

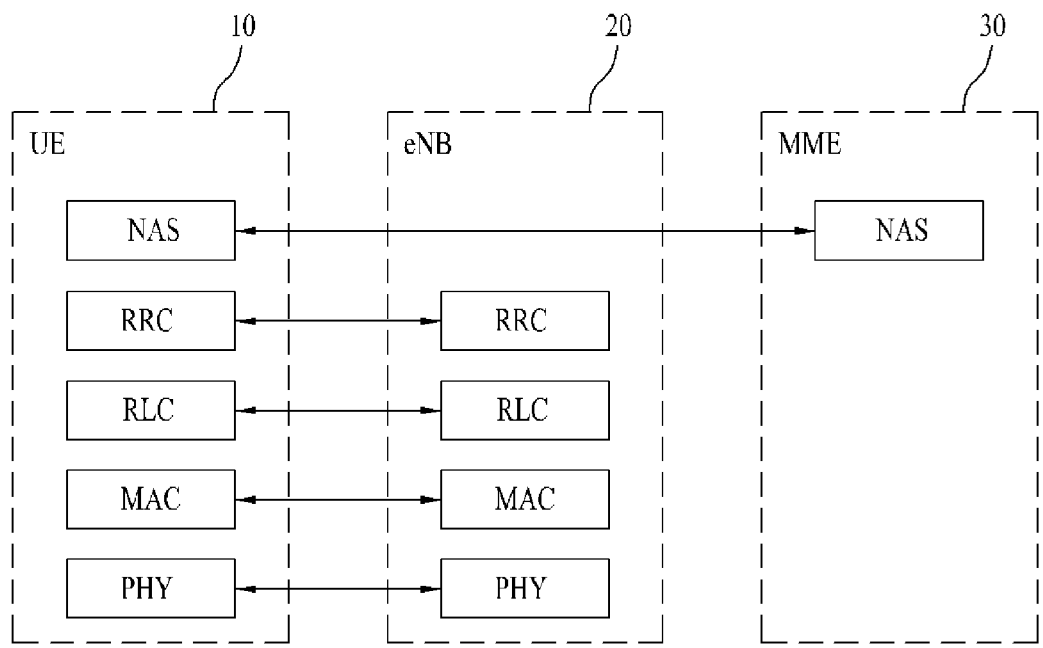

FIG. 3

```
1> if the UE is establishing the RRC connection for mobile terminating calls:
    2> ...
1> else if the UE is establishing the RRC connection for emergency calls:
    2> if SystemInformationBlockType2 includes the ac-BarringInfo:
        3> if the ac-BarringForEmergency is set to FALSE:
            4> if the ac-ActionNotification includes SLN;
                5> draw a random number between 0 and 1
                5> if the random number is less than threshold_1
                    6> Consider access to the cell as not barred
                5> else
                    6> Consider access to the cell as barred
            4> consider access to the cell as not barred:
        3> else if the UE has one or more Access Classes, as stored on the USIM, with a value in the
            range 11..15, which is valid for the UE to use according to TS 22.011 and TS 23.122:
            ...
1> else if the UE is establishing the RRC connection for mobile originating calls:
    2> ...
```

FIG. 4

```
1> if the UE is establishing the RRC connection for mobile terminating calls:
    2> ...
1> else if the UE is establishing the RRC connection for emergency calls:
    2> if SystemInformationBlockType2 includes the ac-BarringInfo:
        3> if the ac-BarringForEmergency is set to FALSE:
            4> if the ac-ActionNotification includes SLN;
                5> draw a random number between 0 and 1
                5> if the random number is less than threshold_1
                    6> Consider access to the cell as not barred
                5> else
                    6> Consider access to the cell as barred
            4> else if the ac-ActionNotification includes MLN;
                5> draw a random number between 0 and 1
                5> if the random number is less than threshold_1
                    6> Take action Type 1 (e.g. Consider access to the cell as not barred)
                5> else if the random number is less than threshold_2
                    6> Take action Type 2 (e.g. Wait for Type_2_Duration)
                5> ...
                    6> ...
                5> else if the random number is less than threshold_N
                    6> Take action Type N (e.g. Change configuration type C)
                5> else
                    6> Consider access to the cell as barred
            4> consider access to the cell as not barred;
        3> else if the UE has one or more Access Classes, as stored on the USIM, with a value in the range 11..15,
           which is valid for the UE to use according to TS 22.011 and TS 23.122:
           ...
1> else if the UE is establishing the RRC connection for mobile originating calls:
    2> ...
```

CHANNEL-OCCUPANCY-STATUS BASED EARLY AVOIDANCE

CROSS-REFERENCE TO RELATED APPLICATIONS

Pursuant to 35 U.S.C. §119(e), this application claims the benefit of earlier filing date and right of priority to provisional applications Ser. No. 61/249,969, filed on Oct. 8, 2009, and Ser. No. 61/355,507, filed on Jun. 16, 2010, the contents of which are incorporated by reference herein in their entirety.

FIELD OF THE INVENTION

The present invention generally relates to wireless communications, and in particular, to reducing call initiation collisions in a wireless communication system.

DISCUSSION OF THE RELATED ART

Desired functionality of a wireless communication system includes accommodating emergency calls. In UMTS MAC and RRC, the physical random access channel (PRACH) is logically partitioned into several subsets using access service class (ASC) in order to provide different levels of priority to those user equipments (UEs) situated in a different levels of emergency (e.g., normal or emergency). The system generally operates a mechanism to give priority to some UEs over other UEs for emergency control purposes. A technique for this is to partition the PRACH portion into several subsets to give more chances to those UEs in a particular situation via prohibiting other UEs from accessing a certain subset of the PRACH.

SUMMARY

In accordance with an embodiment, a method for reducing call initiation collisions in a wireless communication system includes determining, at an eNodeB, a need to reduce a number of call initiation requests arriving from a plurality of user equipment (UEs). One operation provides broadcasting, by the eNodeB, a notification message to the UEs responsive to the determining of the need to reduce the number of call initiation requests, the notification message including information for facilitating a determination of whether a receiving UE is permitted to transmit a call initiation request to the eNodeB. Another feature includes receiving, at the eNodeB, the call initiation request from one or more of the plurality of UEs that are determined to be permitted to transmit the call initiation request.

In accordance with another embodiment, a method for reducing call initiation collisions in a wireless communication system includes receiving, at the UE, a broadcast notification message from an eNodeB, the broadcast notification message comprising information indicating whether the UE is barred from sending a call initiation request to the eNodeB; determining, at the UE, whether the UE is barred from sending the call initiation request based upon the information in the received notification message; permitting the UE to send the call initiation request to the eNodeB if the UE is not barred from sending of the call initiation request; and refraining from sending the call initiation request to the eNodeB if the UE is barred from sending of the call initiation request.

In accordance with yet another embodiment, a network apparatus configured to reduce call initiation collisions in a wireless communication system includes a processor configured to determine a need to reduce a number of call initiation requests arriving at the apparatus from a plurality of user equipment (UEs) operating within the wireless communication system; a transmitter configured to broadcast a notification message to the UEs responsive to the determining of the need to reduce the number of call initiation requests, the notification message comprising information for facilitating a determination of whether a receiving UE is permitted to transmit a call initiation request to the apparatus; and a receiver configured to receive the call initiation request from one or more of the plurality of UEs that are determined to be permitted to transmit the call initiation request.

In accordance with still yet another embodiment a UE configured for reducing call initiation collisions in a wireless communication system includes a receiver configured to receive a broadcast notification message from an eNodeB, the broadcast notification message comprising information indicating whether the UE is barred from sending a call initiation request to the eNodeB; a transmitter configured to send uplink signals to the eNodeB. The UE further includes a processor configured to: determine whether the UE is barred from sending the call initiation request based upon the information in the received notification message; cause the transmitter to send the call initiation request to the eNodeB if the UE is not barred from sending of the call initiation request; and refrain from sending the call initiation request to the eNodeB if the UE is barred from sending of the call initiation request.

These and other embodiments will also become readily apparent to those skilled in the art from the following detailed description of the embodiments having reference to the attached figures, the present disclosure not being limited to any particular embodiment disclosed.

BRIEF DESCRIPTION OF THE DRAWINGS

The above and other aspects and features of the present disclosure will become more apparent upon consideration of the following description of embodiments, taken in conjunction with the accompanying drawing figures.

FIG. 2C is a block diagram of a control-plane (C-plane) protocol stack in an LTE system in accordance with various embodiments of the present invention.

FIG. 3 depicts a method for the UE initiation of a procedure in accordance with various embodiments of the present invention.

FIG. 4 depicts a method for the UE initiation of a procedure in accordance with other embodiments of the present invention.

DETAILED DESCRIPTION OF THE PREFERRED EMBODIMENTS

Figure 1:
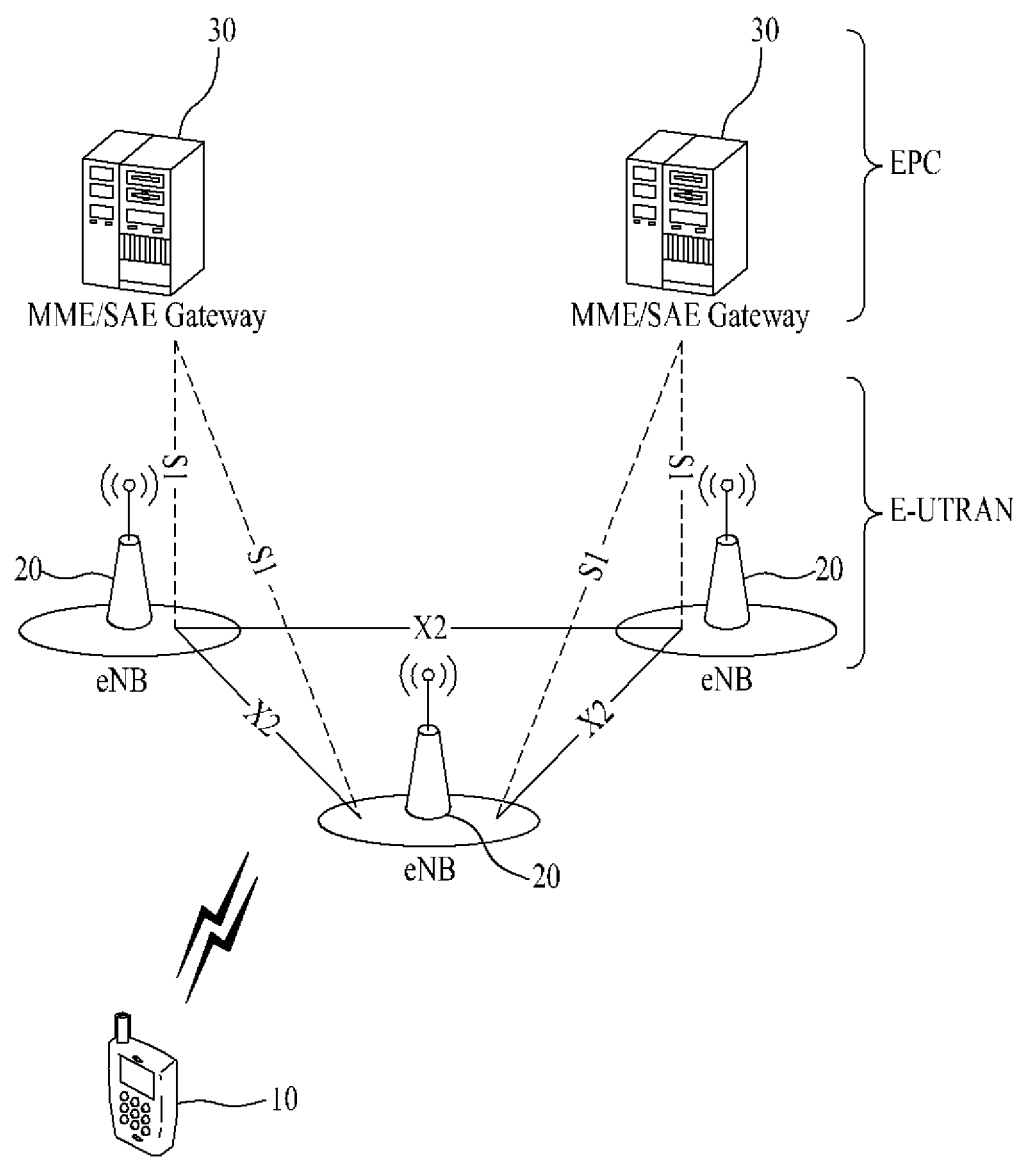
FIG. 1 is a block diagram of an LTE system in accordance with various embodiments of the present invention.

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

It is generally understood that an emergency call should be initiated with less congestion in the uplink, namely, a prioritized random access. This prioritization can be used as "random access priority" itself, i.e. before PRACH, as well as access priority after PRACH. However, such methods typically include congestion in the PRACH access stage. This may cause the success ratio at this stage to be very low, which could also result in the situation that few or no calls are newly accommodated while ongoing calls are being completed as time goes on. For example, traffic channel resources may have room to accommodate calls (traffic packets), whereas calls are not even coming into RRC_CONNECTED mode (from RRC_IDLE) because of failure at the random access procedure. Emergency calls generally include not only calls by rescuers or medical doctors on the scene but also calls for users needing help or assistance (e.g., SOS calls). Thus it may be helpful to consider the possibility that emergency call load is high, even temporarily.

Features described herein may be used in various wireless communication systems such as CDMA, TDMA, FDMA, OFDMA, SC-FDMA and/or other systems. The terms "system" and "network" are often used interchangeably. A CDMA system may implement a radio technology such as Universal Terrestrial Radio Access (UTRA), CDMA2000, etc. UTRA includes Wideband CDMA (WCDMA) and other variants of CDMA. CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and EUTRA are part of Universal Mobile Telecommunication System (UMTS). 3GPP Long Term Evolution 2 (LTE) is the next version of the release of UMTS that uses E-UTRA, which employs OFDMA in the downlink and SC-FDMA in the uplink.

By way of non-limiting example only, further description will relate to an LTE communication system, but such teachings apply equally to other system types. As described above, an LTE system is related to UMTS. The UMTS is a 3rd Generation (3G) asynchronous mobile communication system operating in wideband code division multiple access (WCDMA) based on European systems, global system for mobile communications (GSM) and general packet radio services (GPRS). The LTE is under development by the 3rd generation partnership project (3GPP), which standardized UMTS.

FIG. 1 is a diagram illustrating a network structure of an evolved universal mobile telecommunication system (E-UMTS). The E-UMTS may be also referred to as an LTE system. The system may be widely deployed to provide a variety of communication services such as voice and packet data, and is generally configured to function based upon the various techniques presented herein and discussed in more detail with regard to later figures.

With reference to FIG. 1, the E-UMTS network includes an evolved UMTS terrestrial radio access network (E-UTRAN), an Evolved Packet Core (EPC), and one or more mobile terminals (or user equipment (UE)) 10. The E-UTRAN includes one or more eNodeBs 20. Regarding the EPC, MME/SAE gateway 30 provides an end point of a session and mobility management function for the UE 10. The eNodeB 20 and the MME/SAE gateway 30 may be connected via an S1 interface.

The UE 10 is a communication device carried by a user and may also be referred to as a mobile station (MS), a user terminal (UT), a subscriber station (SS) or a wireless device.

The eNodeB 20 is generally a fixed station that communicates with the UE 10. In addition to being referred to as a base station, the eNodeB 20 may also be referred to as an access point. An eNodeB 20 provides end points of a user plane and a control plane to the UE 10. In general, the eNodeB includes a transmitter and processor, among other components, and is configured to operate in accordance with the various techniques presented herein.

A plurality of UEs 10 may be located in one cell. One eNodeB 20 is typically deployed per cell. An interface for transmitting user traffic or control traffic may be used between eNodeBs 20. As used herein, "downlink" refers to communication from the eNodeB 20 to the UE 10, and "uplink" refers to communication from the UE to the eNodeB.

The MME gateway 30 provides various functions including distribution of paging messages to eNodeBs 20, security control, idle state mobility control, SAE bearer control, and ciphering and integrity protection of non-access stratum (NAS) signaling. The SAE gateway 30 provides assorted functions including termination of U-plane packets for paging reasons, and switching of the U-plane to support UE mobility. For ease of description, the MME/SAE gateway 30 may be referred to herein as simply a "gateway". However, it is understood that such a structure may also include both an MME gateway and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

Figure 2A:
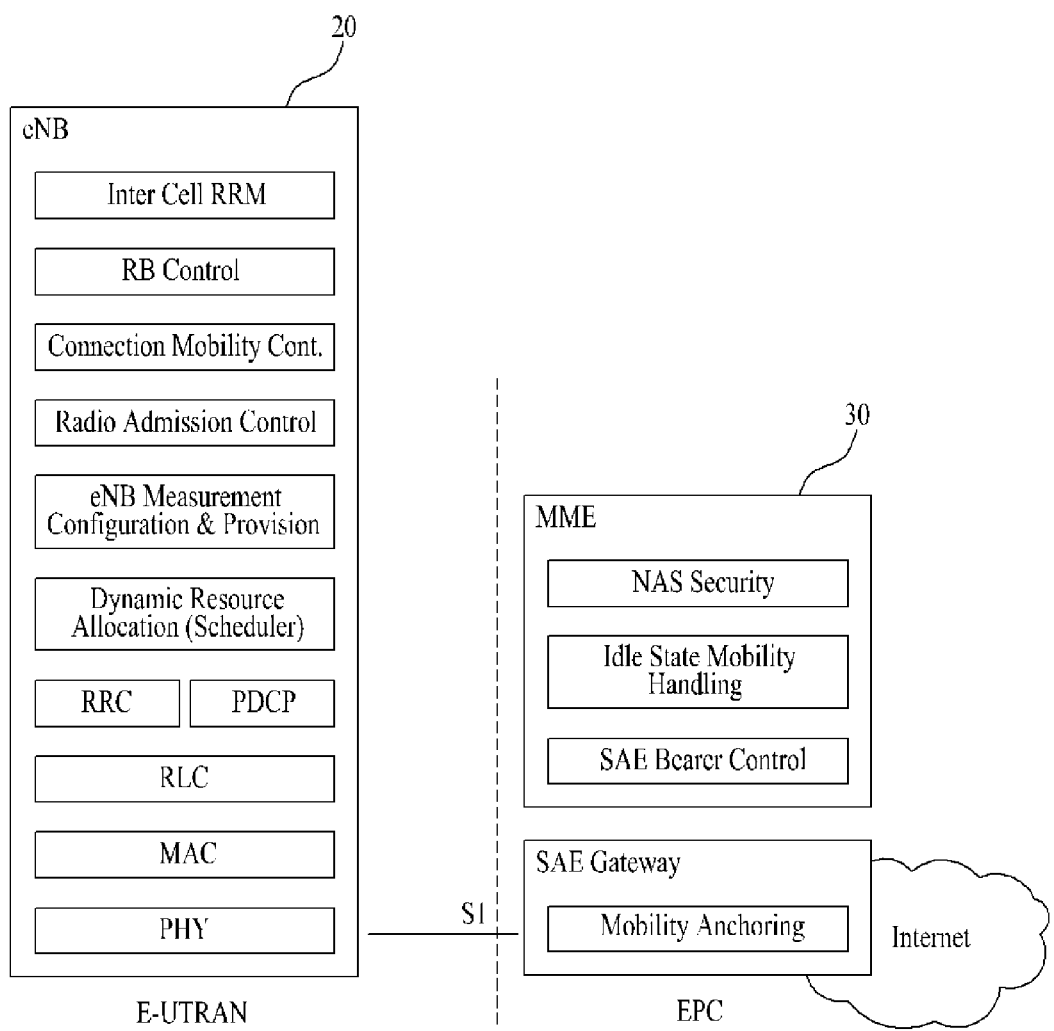
FIG. 2A is block diagram of a logic architecture of an LTE system in accordance with various embodiments of the present invention.

FIG. 2(a) is a block diagram depicting a general structure of a typical E-UTRAN and that of a typical EPC. With reference to FIG. 2(a), eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state.

In the EPC, and as described above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

Figure 2B:
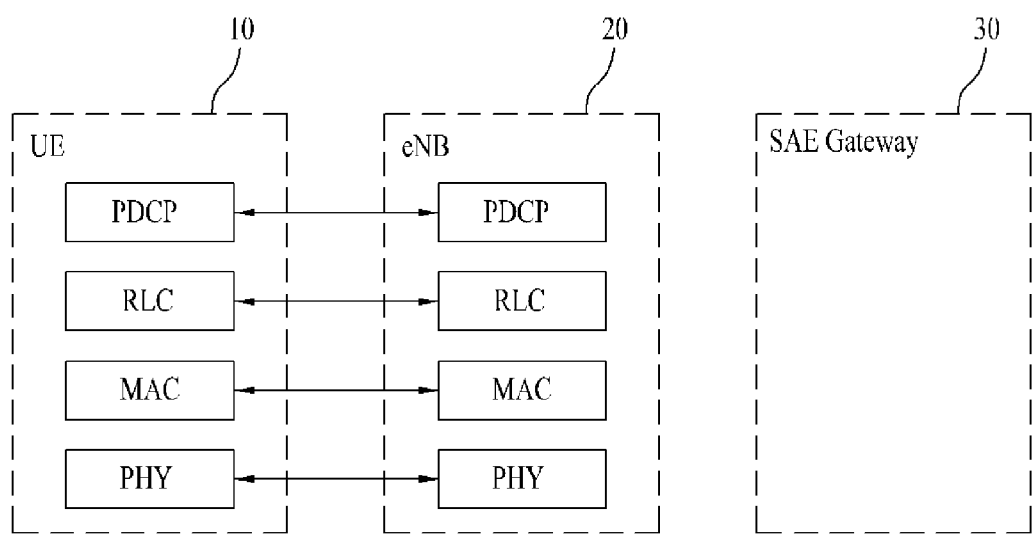
FIG. 2B is a block diagram of a user-plane (U-plane) protocol stack in an LTE system in accordance with various embodiments of the present invention.

FIGS. 2(b) and 2(c) are block diagrams depicting the user-plane protocol and the control-plane protocol stack for the E-UMTS network. With reference to FIGS. 2(b) and 2(c), the protocol layers may be divided into a first layer (L1), a second layer (L2) and a third layer (L3) based upon the three lower layers of an open system interconnection (OSI) standard model as known in the art of communication systems.

The first layer L1 (or the physical layer) provides an information transmission service to an upper layer using a physical channel. The physical layer is connected with a medium access control (MAC) layer located at a higher level through a transport channel, and data between the MAC layer and the physical layer are transferred via the transport channel. Between different physical layers, namely, between physical layers of a transmission side and a reception side (for example, between physical layers of UE 10 and eNodeB 20), data are transferred via the physical channel 21.

The MAC layer of Layer 2 (L2) provides services to a radio link control (RLC) layer (which is a higher layer) via a logical channel. The RLC layer of Layer 2 (L2) supports a reliable transmission of data. Although the RLC layer is shown in FIGS. 2(*b*) and 2(*c*) as being separate from the MAC layer, it is understood that the functions of the RLC layer may be performed by the MAC layer and that, therefore, a separate RLC layer is not required. With reference to FIG. 2(*b*), the packet data convergence protocol (PDCP) layer of Layer 2 (L2) performs a header compression function that reduces unnecessary control information such that data being transmitted by employing Internet protocol (IP) packets, such as IPv4 or IPv6, can be efficiently sent over a radio (wireless) interface that has a relatively small bandwidth.

With reference to FIG. 2(*c*), a radio resource control (RRC) layer located at the lowest portion of the third layer (L3) is typically only defined in the control plane and controls logical channels, transport channels and the physical channels in relation to the configuration, reconfiguration, and release of the radio bearers (RBs). Here, the RB signifies a service provided by the second layer (L2) for data transmission between the terminal and the E-UTRAN.

With reference to FIG. 2(*b*), the RLC and MAC layers (terminated in an eNodeB 20 on the network side) may perform functions such as Scheduling, Automatic Repeat Request (ARQ), and hybrid automatic repeat request (HARM). The PDCP layer (terminated in eNodeB 20 on the network side) may perform the user plane functions such as header compression, integrity protection, and ciphering.

With reference to FIG. 2(*c*), the RLC and MAC layers (terminated in an eNodeB 20 on the network side) perform the same or similar functions as for the control plane. The RRC layer (terminated in an eNodeB 20 on the network side) may perform functions such as broadcasting, paging, RRC connection management, Radio Bearer (RB) control, mobility functions, and UE measurement reporting and controlling. The NAS control protocol (terminated in the MME of gateway 30 on the network side) may perform functions such as a SAE bearer management, authentication, LTE_IDLE mobility handling, paging origination in LTE_IDLE, and security control for the signaling between the gateway and UE 10.

The NAS control protocol may use three different states: first, a LTE_DETACHED state if there is no RRC entity; second, a LTE_IDLE state if there is no RRC connection while storing minimal UE information; and third, an LTE_ACTIVE state if the RRC connection is established.

Also, the RRC state may be divided into two different states such as an RRC_IDLE state and an RRC_CONNECTED state. In the RRC_IDLE state, the UE 10 may receive broadcasts of system information and paging information while the UE specifies a Discontinuous Reception (DRX) configured by NAS, and the UE has been allocated an identification (ID) which uniquely identifies the UE in a tracking area. Also, in the RRC-IDLE state, no RRC context is stored in the eNodeB.

In the RRC_IDLE state, the UE 10 specifies the paging DRX (Discontinuous Reception) cycle. Specifically, the UE 10 monitors a paging signal at a specific paging occasion of every UE specific paging DRX cycle.

In the RRC_CONNECTED state, the UE 10 has an E-UTRAN RRC connection and a context in the E-UTRAN, such that transmitting and/or receiving data to/from the network (eNodeB) becomes possible. Also, the UE 10 can report channel quality information and feedback information to the eNodeB.

In RRC_CONNECTED state, the E-UTRAN knows the cell to which the UE 10 belongs. Therefore, the network can transmit and/or receive data to/from UE 10, the network can control mobility (handover) of the UE, and the network can perform cell measurements for a neighboring cell.

Issues addressed herein do not merely focus on the matter of "multiple priority classes" to provide priority for emergency calls, but also include the issue of "success ratio of PRACH access" among emergency calls. Whether or not the calls are differentiated in priority levels, if call initiation load becomes very high, it is expected that only a few initiation requests can be successful at the PRACH access stage. Various techniques provided herein relate to improving these phenomena and the motivation is given to emergency calls (even when such methods are also used for any other classes of calls).

In practical emergency situations, there are several kinds of calls or those making a call (e.g., normal calls and emergency calls). Regarding emergency calls, such calls may involve rescuers or medical doctors, or SOS calls from those in danger/emergency. SOS calls typically result in a high call load.

When the random access load is high, more specifically, when there are collisions, colliding UEs may randomly select the re-trial instant in accordance with the exponential back-off rule. The purpose of this is to distribute load over a longer time interval in order to reduce the chance of collision. As a result, the success of random access will typically cause a delay that grows exponentially among the uncontrolled large number of competing UEs.

Thus, it is attractive that the eNB, or if appropriate, other entities (e.g., RN) should inform UEs of this occupancy status information in emergency situations or also in other appropriate cases, in order for UEs of low priority not to disturb others and accordingly to reduce the random access load. This provides a mechanism to early on avoid the unnecessary failure of random access. This technique may increase the probability of success for a random access in heavy congestion cases.

Similar techniques will be described in more detail herein, such techniques generally reducing the chance of collision. One feature of these techniques is that information and control may be provided to competing UEs prior to PRACH access, and thus the expected delay until success is much shorter by the use of prior control of random access load. In general, such techniques vary somewhat from general "barring" methods in that "barring" is an issue after PRACH stage, whereas various techniques herein are before the PRACH stage. It is common to use the phrase "load indication" for load balancing or interference mitigation purposes only in the "connected state" (similar to the term of "RRC_CONNECTED" state in 3GPP) but not for early stage barring purposes. These items also carry different types of information.

The following will address the situation for emergency calls (e.g., calls that belong to the class with the highest priority). It is noted that the term "PRACH out-rate" will sometimes be used to refer to success rate of random accesses in PRACH. This amount can be considered as the amount to "traffic channel in-rate."

Consider first action by the eNB, which includes notification to the UEs. Such action may alternatively or additionally be performed by the NB, the RN, or the like. One operation includes the eNB sending the traffic channel occupancy and PRACH out-rate information to UEs using, for example, the System Information Block (SIB). The period of notification may be determined by a suitable entity (e.g., eNB, NB, RN, and the like) based on one or more conditions. Examples of such conditions include traffic load in the traffic channel, the random access load in the PRACH, request from neighboring eNB (or NB, RN), and/or combinations thereof The notification may include various types of information. For instance, it may include the necessary action (e.g., 0x01 (action should be taken)) or a threshold. In general, threshold values can be delivered or they can be pre-planned (no need for the UE to receive). The term "ac-ActionNotification" will often be used herein to refer to this notification message.

In some scenarios, the eNB may choose the level of notification to specify in the ac-ActionNotification (e.g., single level notification (SLN), multiple level notification (MLN), and the like). SLN typically includes one or more bits (for flagging purpose) and additional bits (for threshold notification purpose) may be used to indicate necessary action is needed by the UE's receiving this notification.

MLN generally includes more than one bit and can be used to indicate the necessary action and level of action (e.g. how much each UE should wait or with how much probability each UE should go into a waiting timer period). For example consider the scenario in which levels are defined from zero (00) to N−1. If N is broadcast with flag on (for example, 0x01), each UE may take heterogeneous actions (e.g. one UE has to wait 10 time units whereas the other UE has to wait 100 time units, or where one UE has to wait 10 time units whereas the other UE has to change some configurations (e.g., sub-channel frequency, backoff rate, etc., and change rule—random or specified).

Consider next action by the UEs, which typically is in response to or after receiving the notification. One scenario is where each UE attempts to initiate an emergency call and receives the noted notification (e.g., ac-ActionNotification). In the SLN case, the UE may draw a random number (e.g., between 0 and 1), and if the random number is smaller than the threshold, it should follow the notified action.

In the MLN case, the UE may draw a random number (e.g., between 0 and 1), and if the random number belongs to a specific range, then it should follow the action defined for that range. For instance, consider:

Condition in notations:
0<threshold_1<threshold_2< . . . <threshold_N<1
Procedure:
If (0<random number<threshold_1) do Type_1
Else if (threshold_1<random number<threshold_2) do Type_2
. . .
Else if (threshold_N<random number<1) do Type_N.

The various actions (or types) may include any action required or desired. For example, consider the tasks:
"to start random access",
"to wait type_1_duration",
"to wait type_2_duration",
. . .,
"to wait type_M_duration",
"to change configuration—type 1",
. . .,
"to change configuration—type C."

Further tasks include different types of waiting time duration may also be used to indicate how many time units the UE should wait to start the next step of random access, and different types of configuration chance may be used to indicate what to change (e.g., frequency band, back-off interval, rate of back-off interval growth, and the like).

Furthermore, if the residence cell of a UE changes whether a call is active or not, the UE can discard the former ac-ActionNotification. Another feature that may be implemented is when the UE that has received the ac-ActionNotification is turned off, it can store this notification but the use of this information when the UE is turned on (even before the designated time period) can be "optional" or "mandatory."

For example, if the UE is turned off and then on again, the former ac-ActionNotification can be discarded ("optional") or it should be followed ("mandatory"). This mandatory procedure is for the originally intended purpose.

FIG. 3 depicts a method for the UE initiation of a procedure in accordance with various embodiments of the present invention. This example relates to the single level notification case. In particular, consider where the UE initiates a procedure when the upper layers request establishment of an RRC connection while the UE is in RRC_IDLE mode. Upon initiation of the procedure, the UE may proceed as follows.

In this figure, if the UE is establishing the RRC connection for mobile terminating calls then any procedure or action (denoted by 2> . . . ) may therefore be performed. However, in the "else clause" if the UE is establishing the RRC connection for emergency calls and there is a check to see if SystemInformationBlockType2 includes the ac-BarringInfo. If the ac-BarringForEmergency is set to FALSE and if the ac-ActionNotification includes SLN, then consider:

UE draws a random number (e.g., between 0 and 1)
if the random number is less than threshold_1, then consider access to the cell as not barred. Otherwise, consider access to the cell as barred.

The level 3 else considers that if the UE has one or more Access Classes, as stored on the USIM, for example, with a value in a range (e.g., 11 . . . 15) which is valid for the UE to use, then control may flow to various other operations depicted as " . . . " in the figure. As an example, the validity of the Access Class may be performed according to TS 22.011 and TS 23.122, for example.

The level 1 else clause considers if the UE is establishing the RRC connection for mobile originating calls then still further procedures may be performed.

FIG. 4 depicts a method for the UE initiation of a procedure in accordance with another embodiment of the present invention. This example relates to the combined SLN and multiple level notification (MLN) case. In this example, the UE initiates the procedure when upper layers request establishment of an RRC connection while the UE is in RRC_IDLE mode. Upon initiation of the procedure, the UE may consider if the UE is establishing the RRC connection for mobile terminating calls. If so, then various procedures may then be performed.

Otherwise, if the UE is establishing the RRC connection for emergency calls, then consider if the SystemInformation-BlockType2 includes the ac-BarringInfo and whether if the ac-BarringForEmergency is set to FALSE. If so, and if the ac-ActionNotification includes the SLN, the UE may draw a random number (e.g., between 0 and 1) and if the random number is less than a threshold_1, consider access to the cell as not barred. Otherwise, consider access to the cell as barred.

The level 4 else indicates that if the ac-ActionNotification includes the MLN, then the UE may draw a random number (e.g., between 0 and 1) and if the random number is less than a threshold_1, the UE may take action Type 1 (e.g. consider access to the cell as not barred). Otherwise, if the random number is less than a threshold_2, then the UE may take action Type 2 (e.g. wait for Type_2_Duration).

A level 6 else considers if the random number is less than threshold_N, and if so the UE may take action Type N (e.g. change configuration type C). Otherwise, access to the cell may be barred.

A level 4 process consider access to the cell as not barred, and a level 3 process considers that the else provision in which if the UE has one or more access classes, as stored on the USIM, for example, with a value in a range (e.g., 11 . . . 15) which is valid for the UE to use, then control may flow to various other operations depicted as " . . . " in the figure. As an example, the validity of the Access Class may be performed in according to TS 22.011 and TS 23.122, for example.

The level 1 else clause considers the that if the UE is establishing the RRC connection for mobile originating calls then still further procedures may be performed.

Still further embodiments relate to the scenario in which the SIB2, for example, carries a piece of information notifying that certain types/classes of Machine-Type Communication (MTC) devices are barred and for how long they are barred. For example, in MTC, the random access load from a large amount of MTC devices will commonly cause heavy congestion at the random access phase. Because of the inherent nature of the random access, once congestion in random access happens, it will take a relatively long period of time until those random access requests are successfully resolved (e.g., accommodated).

As a first example, consider the following arrangement:

MTC_device_class_1 barring_indicator barring_ratio barring_period.

Where the barring indicator is used for indicating whether or not the class is barred, barring ratio is used for giving a certain probability to the class barring, and barring period is used to indicate for how long the class is barred.

Consider now action occurring at the eNB and/or RN. In general the barring information may be configured based on current measurement of random access behavior. Action at the MTC device includes following the instruction in the received barring information, wait for a specific period of time, and change random access configuration.

The following will demonstrate various performance characteristics present in the SLN mode, and how the MLN is in some situations better than SLN. The performance criteria discussed includes delay, i.e., time period to be spent for getting through the RACH procedure. To simplify the discussion of the performance various assumptions will be made (as discussed below).

First consider an existence of two access service classes: emergency class and normal class. Emergency class will typically have higher priority over the normal class and is not affected by how many RACH requests of normal class the system may receive. For example, normal classes can be completely barred. In this case, only the emergency class is considered in this performance analysis.

In this example, let R(n), O(n), and C(n) denote the residual load, offered load, and carried load at the n-th trial, respectively. The residual load is the amount generated but not served by the system (i.e., not gotten through the RACH procedure). The offered load is the amount to be loaded on the RACH procedure. So if 100% are barred, then the offered load at the n-th trial becomes zero even if there are residual load in the network. Carried load is the amount that is actually gotten through the RACH procedure. For simplicity, consider a system that has a single frequency channel for RACH for both the SLN and the MLN. Suppose that the load at a certain emergency instant is $\lambda$ and let the probability of barring for the emergency class be b (=1-a). Assume that RACH requests are mutually independent and are patient in that they will never give up the RACH procedure once initiated.

Consider the following recursive relations:

SLN: $R(n+1)=R(n)-C(n)$, $O(n)=R(n)*a$, $C(n)=O(n)*\exp(-O(n))$

Rel-8: $R(n+1)=R(n)-C(n)$, $O(n)=R(n)$, $C(n)=O(n)*\exp(-O(n))$.

Accordingly, in various embodiments, when MTC devices receive a SIB (System Information Block) message from the eNodeB, the noted "barring ratio" is the same or similar to that of the barring ratio of other classes. For example, a MTC device may draw a random number between 0 and 1, and compare it to the "barring ratio" value; if it is smaller than the "barring ratio", the cell is not consider to be barred; otherwise, it is considered as barred.

Figure 5:
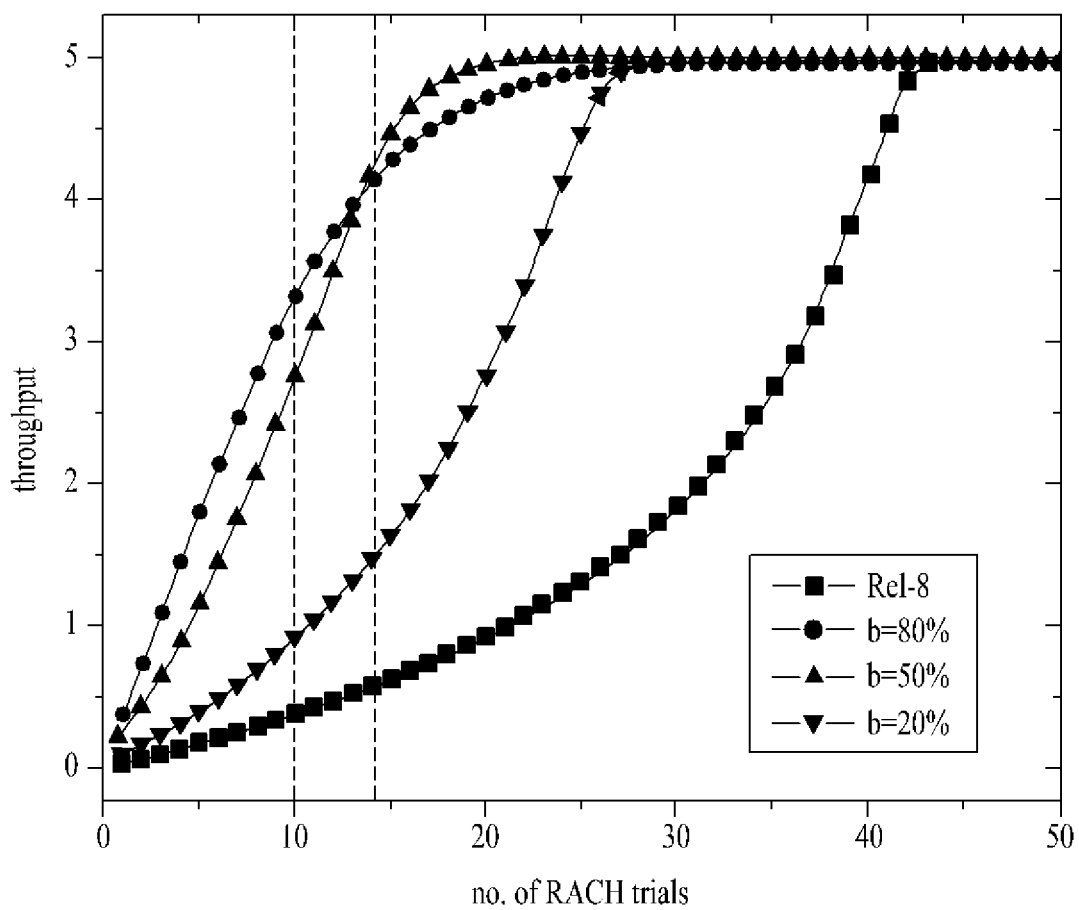
FIGS. 5-7 are graphs depicting a rate of service in the RACH procedure versus the number of RACH (re)-trials.

With this understanding of various embodiments, consider the following result set forth in FIG. 5. FIG. 5 is a graph depicting a rate of service in the RACH procedure versus the number of RACH (re)-trials. In this example, consider $\lambda=5$. The rate of convergence of the served RACH attempts is shown. The current scheme (Rel-8 as an example) presents the slowest convergence rate, which means the Rel-8 scheme takes the longest period of time until the entire original burden can get through the RACH procedure. As observed, the portion of barring, say "b", has effect on the rate of convergence. However, the degree of effect depends on the various factors: the operation with b=80% converges faster than the one with b=50% when the number of RACH trials is less than approximately 14 but the latter converges faster after that point (i.e., 15 and later).

Figure 6:
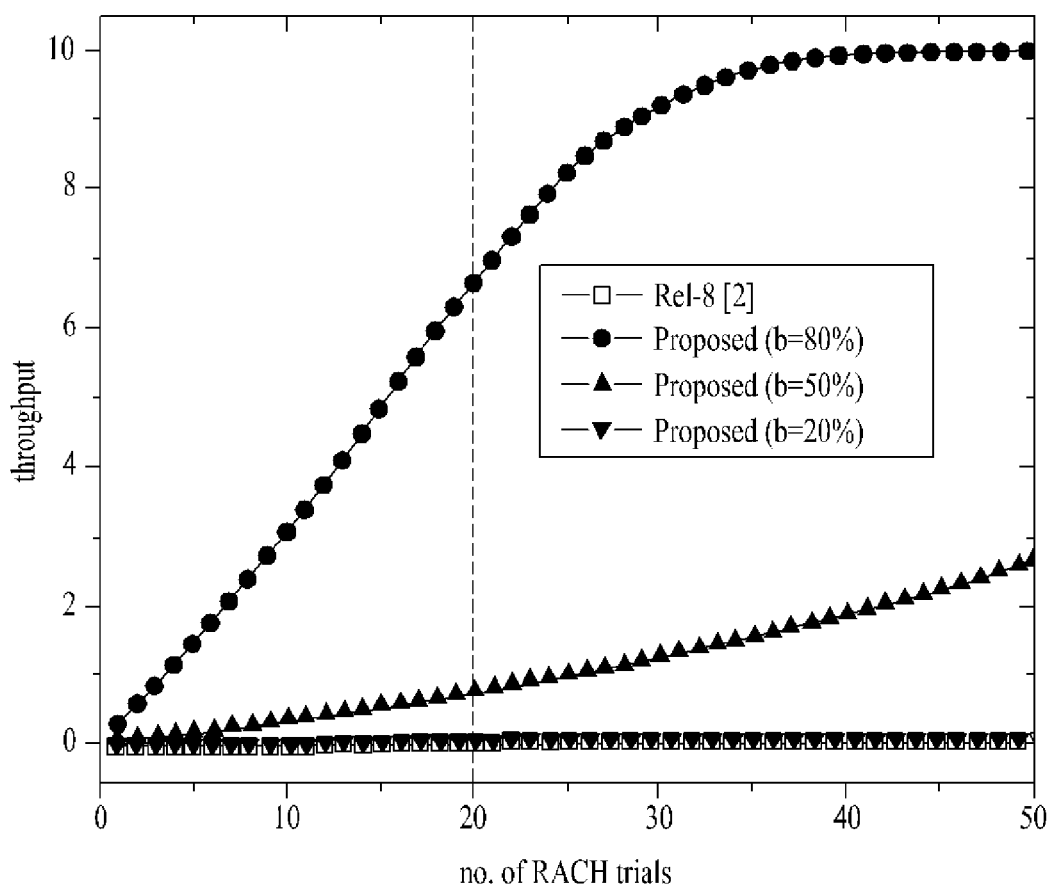
Figure 7:
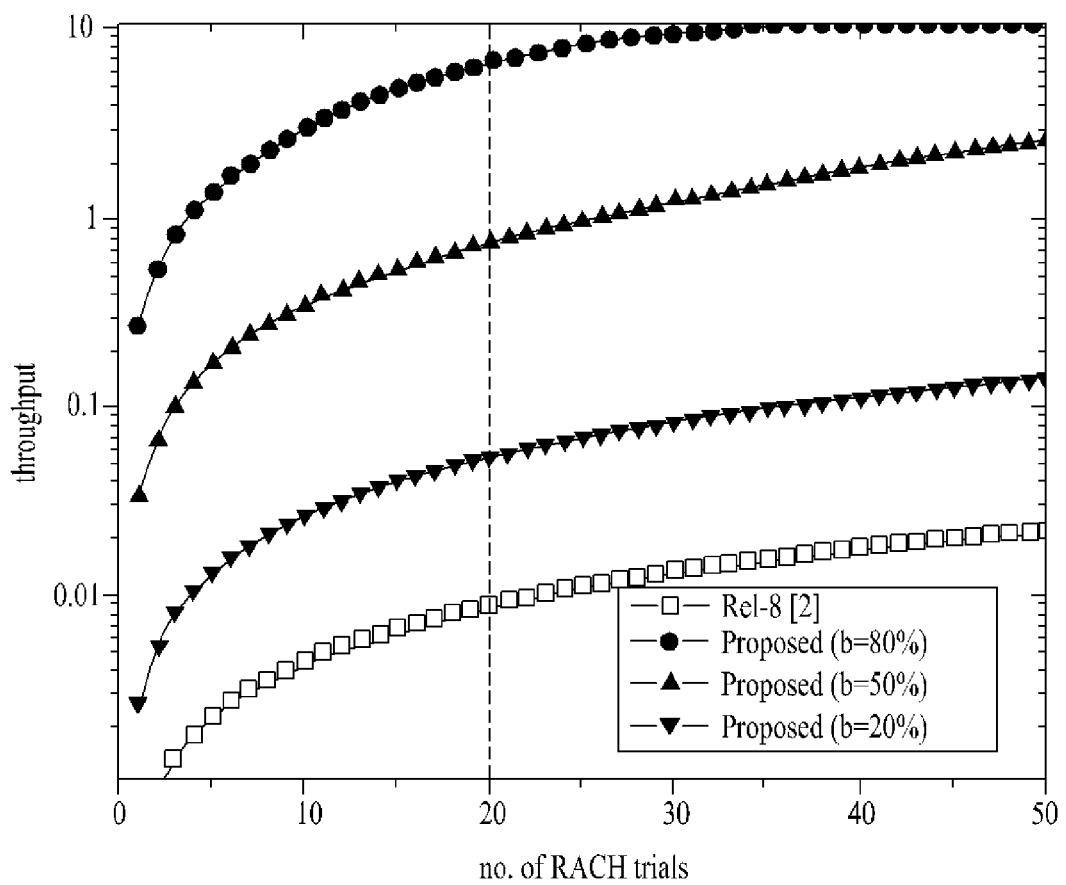

FIGS. 6 and 7 are graphs depicting a rate of service in the RACH procedure versus the number of RACH (re)-trials. Such graphs are similar to that shown in FIG. 5, but in these figures the result is present for $\lambda=10$ and they are in different scales. Specifically, FIG. 6 is in decimal scales and FIG. 7 is in a logarithmic scale.

In FIG. 6, the proposed scheme is shown providing better performance in the rate of convergence, i.e., delay of serving the original request amount. Compared to the load at $\lambda=5$, the load at $\lambda=10$ implies that the given emergency situation is more heavily populated and it is expected that the degree of congestion is heavier. Only with a doubled amount in load, the rate of convergence shows very different behaviors. Specifically, the operation with b=80% still converges to the 100% of service (i.e., to $\lambda=10$) approximately after 40 RACH (re-)trials, whereas the one with Rel-8 almost stays on around zero. The performance for Rel-8, the service rate (cumulative) is less than 0.584 even after 1000 RACH (re)-trials, which means less than 0.584 (in Erlang) can be successfully getting through the RACH procedure on average. For the proposed ones with b=20%, 50%, and 80%, the service rate becomes approximately 9.99 (i.e., 99.9% for 10 Erlang) after 557, 89, and 51 RACH (re)-trials, respectively.

For observations in the earlier phase (less than 20 RACH re-trials), the service rate is 66.5%, 7.8%, and 5.5% for the proposed operations with b=80%, 50%, 20%, respectively whereas the service rate of the current one in Rel-8 is 0.9%. Note that the comparison between the SLN and the MLN cases can be evaluated in a similar way.

Figure 8:
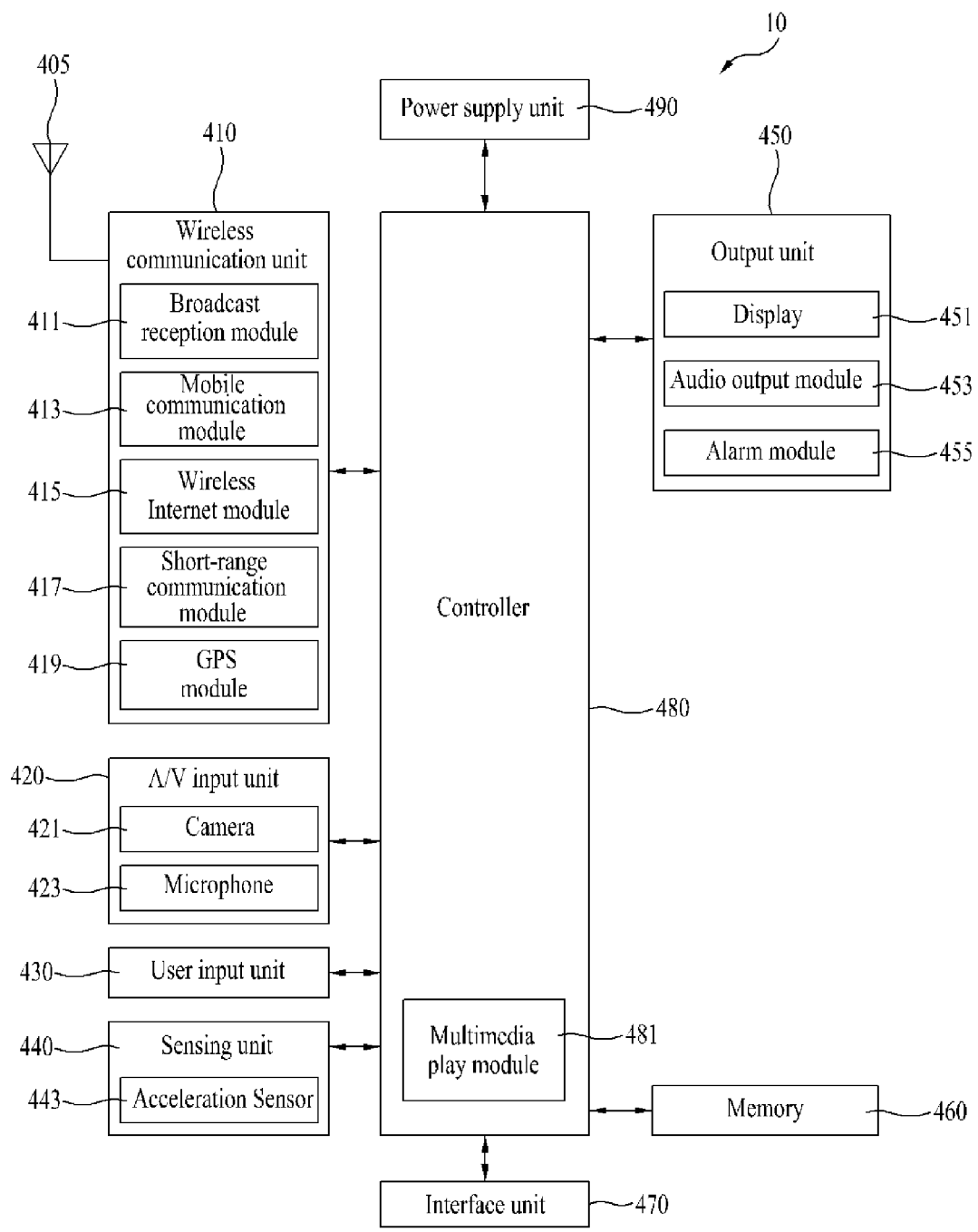
FIG. 8 is a block diagram showing in more detail various components which may be implemented in a mobile terminal according to various embodiments of the present invention.

FIG. 8 is a block diagram showing in more detail various components which may be implemented in a mobile terminal (e.g., UE 10 of FIG. 1) according to various embodiments of the present invention. It is understood that greater or fewer components than those shown may be implemented.

Referring to FIG. 8, the mobile terminal, denoted as UE 10, may include a wireless communication unit 410, an audio/ video (A/V) input unit 420, a user input unit 430, a sensing unit 440, an output unit 450, a memory 460, an interface unit 470, a controller 480, and a power supply unit 490. Two or more of the wireless communication unit 410, the A/V input unit 420, the user input unit 430, the sensing unit 440, the output unit 450, the memory 460, the interface unit 470, the controller 480, and the power supply unit 490 may be incorporated into a single unit, or some of the wireless communication unit 410, the A/V input unit 420, the user input unit 430, the sensing unit 440, the output unit 450, the memory 460, the interface unit 470, the controller 480, and the power supply unit 490 may be divided into two or more smaller units.

The wireless communication unit 410 may include a broadcast reception module 411, a mobile communication module 413, a wireless Internet module 415, a short-range communication module 417, and a global positioning system (GPS) module 419.

The broadcast reception module 411 receives a broadcast signal and/or broadcast-related information from an external broadcast management server through a broadcast channel. Examples of a broadcast channel include a satellite channel and a terrestrial channel. The broadcast management server may be a server which generates broadcast signals and/or broadcast-related information and transmits the generated broadcast signals and/or the generated broadcast-related information or a server which receives and then transmits previously-generated broadcast signals and/or previously-generated broadcast-related information.

Examples of broadcast-related information include broadcast channel information, broadcast program information, and broadcast service provider information. Examples of the broadcast signal include a TV broadcast signal, a radio broadcast signal, a data broadcast signal, or the combination of a data broadcast signal and either a TV broadcast signal or a radio broadcast signal. The broadcast-related information may be provided to the mobile terminal through a mobile communication network. In this case, the broadcast-related information may be received by the mobile communication module 413, rather than by the broadcast reception module 411. The broadcast-related information may come in various forms, for example, electronic program guide (EPG) of digital multimedia broadcasting (DMB) or electronic service guide (ESG) of digital video broadcast-handheld (DVB-H).

Broadcast reception module 411 may receive the broadcast signal using various broadcasting systems such as digital multimedia broadcasting-terrestrial (DMB-T), digital multimedia broadcasting-satellite (DMB-S), media forward link only (MediaFLO), DVB-H, and integrated services digital broadcast-terrestrial (ISDB-T). In addition, the broadcast reception module 411 may be configured to be suitable for nearly all types of broadcasting systems other than those set forth herein.

The broadcast signal and/or the broadcast-related information received by the broadcast reception module 411 may be stored in memory 460. The mobile communication module 413 transmits wireless signals to or receives wireless signals from at least one or more of a base station, an external station, and a server through a mobile communication network. The wireless signals may include various types of data according to whether the mobile terminal transmits/receives voice call signals, video call signals, or text/multimedia messages.

The wireless Internet module 415 may be a module for wirelessly accessing the Internet. The wireless Internet module 415 may be embedded in the mobile terminal or may be installed in an external device.

The short-range communication module 417 may be a module for short-range communication. The short-range communication module 417 may use various short-range communication techniques such as Bluetooth®, radio frequency identification (RFID), infrared data association (IrDA), ultra wideband (UWB), and ZigBee®.

The GPS module 419 may receive position information from one or more satellites (e.g., GPS satellites).

The A/V input unit 420 may be used to receive audio signals or video signals. The A/V input unit 420 may include one or more cameras 421 and a microphone 423. The camera 421 processes various image frames such as still images or moving images captured by an image sensor during a video call mode or an image capturing mode. The image frames processed by the camera 421 may be displayed by a display module 451.

The image frames processed by the camera 421 may be stored in the memory 460 or may be transmitted outside the mobile terminal through the wireless communication unit 410. The mobile terminal may include more than two cameras.

The microphone 423 receives external sound signals during a call mode, a recording mode, or a voice recognition mode with the use of a microphone and converts the sound signals into electrical sound data. In the call mode, the mobile communication module 413 may convert the electrical sound data into data that can be readily transmitted to a mobile communication base station and then output the data obtained by the conversion. The microphone 423 may use various noise removal algorithms to remove noise that may be generated during the reception of external sound signals.

The user input unit 430 generates key input data based on user input for controlling the operation of the mobile terminal. The user input unit 430 may be implemented as a keypad, a dome switch, a touch pad (either static pressure or constant electricity), a jog wheel, or a jog switch. In particular, if the user input unit 430 is implemented as a touch pad and forms a mutual layer structure along with the display module 451, the user input unit 430 and the display module 451 may be collectively referred to as a touch screen.

The sensing unit 440 determines a current state of the mobile terminal such as whether the mobile terminal is opened or closed, the position of the mobile terminal and whether the mobile terminal is placed in contact with a user. In addition, the sensing unit 440 generates a sensing signal for controlling the operation of the mobile terminal.

For example, when the mobile terminal is a slider-type mobile phone, the sensing unit 440 may determine whether the mobile terminal is opened or closed. In addition, the sensing unit 440 may determine whether the mobile terminal is powered by the power supply unit 490 and whether the interface unit 470 is connected to an external device.

The sensing unit 440 may include an acceleration sensor 443. Acceleration sensors are a type of device for converting an acceleration variation into an electric signal. With recent developments in micro-electromechanical system (MEMS) technology, acceleration sensors have been widely used in various products for various purposes. For example, an acceleration sensor may be used as an input device for a computer game and may sense the motion of the human hand during a computer game.

Two or three acceleration sensors 443 representing different axial directions may be installed in the mobile terminal. Alternatively, only one acceleration sensor 443 representing a Z axis may be installed in the mobile terminal.

The output unit 450 may output audio signals, video signals, and alarm signals. The output unit 450 may include the display module 451, an audio output module 453, and an alarm module 455.

The display module 451 may display various information processed by the mobile terminal. For example, if the mobile terminal is in a call mode, the display module 451 may display a user interface (UI) or a graphical user interface (GUI) for making or receiving a call. If the mobile terminal is in a video call mode or an image capturing mode, the display module 451 may display a UI or a GUI for capturing or receiving images.

If the display module 451 and the user input unit 430 form a mutual layer structure and are thus implemented as a touch screen, the display module 451 may be used not only as an output device but also as an input device. If the display module 451 is implemented as a touch screen, the display module 451 may also include a touch screen panel and a touch screen panel controller.

The touch screen panel is a transparent panel attached onto the exterior of the mobile terminal and may be connected to an internal bus of the mobile terminal. The touch screen panel monitors whether the touch screen panel is touched by a user. Once a touch input to the touch screen panel is detected, the touch screen panel transmits a number of signals corresponding to the touch input to the touch screen panel controller.

The touch screen panel controller processes the signals transmitted by the touch screen panel and transmits the processed signals to the control unit 480. The control unit 480 then determines whether a touch input has been generated and which part of the touch screen panel has been touched based on the processed signals transmitted by the touch screen panel controller.

As described above, if the display module 451 and the user input unit 430 form a mutual layer structure and are thus implemented as a touch screen, the display module 451 may be used not only as an output device but also as an input device. The display module 451 may include at least one of a liquid crystal display (LCD), a thin film transistor (TFT)-LCD, an organic light-emitting diode (OLED), a flexible display, and a three-dimensional (3D) display.

The mobile terminal may include two or more display modules 451. For example, the mobile terminal may include an external display module and an internal display module.

The audio output module 453 may output audio data received by the wireless communication unit 410 during a call reception mode, a call mode, a recording mode, a voice recognition mode, or a broadcast reception mode or may output audio data present in the memory 460. In addition, the audio output module 453 may output various sound signals associated with the functions of the mobile terminal such as receiving a call or a message. The audio output module 453 may include a speaker and a buzzer.

The alarm module 455 may output an alarm signal indicating the occurrence of an event in the mobile terminal. Examples of the event include receiving a call signal, receiving a message, and receiving a key signal. Examples of the alarm signal output by the alarm module 455 include an audio signal, a video signal, and a vibration signal.

The alarm module 455 may output a vibration signal upon receiving a call signal or a message. In addition, the alarm module 455 may receive a key signal and may output a vibration signal as feedback to the key signal.

Once a vibration signal is output by the alarm module 455, the user may recognize that an event has occurred. A signal for notifying the user of the occurrence of an event may be output by the display module 451 or the audio output module 453.

The memory 460 may store various programs necessary for the operation of the controller 480. In addition, the memory 460 may temporarily store various data such as a phonebook, messages, still images, or moving images.

The memory 460 may include at least one of a flash memory type storage medium, a hard disk type storage medium, a multimedia card micro type storage medium, a card type memory (e.g., a secure digital (SD) or extreme digital (XD) memory), a random access memory (RAM), and a read-only memory (ROM). The mobile terminal may operate a web storage, which performs the functions of the memory 460 on the Internet.

The interface unit 470 may interface with an external device that can be connected to the mobile terminal. The interface unit 470 may be a wired/wireless headset, an external battery charger, a wired/wireless data port, a card socket such as for a memory card or a subscriber identification module (SIM)/user identity module (UIM) card, an audio input/output (I/O) terminal, a video I/O terminal, or an earphone.

The interface unit 470 may receive data from an external device or may be powered by an external device. The interface unit 470 may transmit data provided by an external device to other components in the mobile terminal or may transmit data provided by other components in the mobile terminal to an external device.

The controller 480 may control the general operation of the mobile terminal. For example, the controller 480 may perform various control operations regarding making/receiving a voice call, transmitting/receiving data, or making/receiving a video call. The controller 480 may include a multimedia play module 481, which plays multimedia data. The multimedia play module 481 may be implemented as a hardware device and may be installed in the controller 480. Alternatively, the multimedia play module 481 may be implemented as a software program.

The power supply unit 490 is supplied with power by an external power source or an internal power source and supplies power to other components in the mobile terminal.

In alternative implementations, certain logic operations may be performed in a different order, modified or removed and still implement exemplary embodiments of the present invention. Moreover, operations may be added to the above described logic and still conform to assorted implementations of the invention.

Furthermore, the described embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor.

The code in which exemplary embodiments are implemented may further be accessible through a transmission media or from a file server over a network. In such cases, the article of manufacture in which the code is implemented may include a transmission media, such as a network transmission line, wireless transmission media, signals propagating through space, radio waves, infrared signals, etc. Of course, those skilled in the art will recognize that many modifications may be made to this configuration, and that the article of manufacture may comprise any information bearing medium known in the art.

The logic implementation shown in the figures describe specific operations as occurring in a particular order. In alternative implementations, certain logic operations may be performed in a different order, modified or removed and still implement certain embodiments of the present invention. Moreover, operations may be added to the above described logic and still conform to the described implementations.

The foregoing embodiments and features are merely exemplary and are not to be construed as limiting the present invention. The present teachings can be readily applied to other types of apparatuses and processes. The description of such embodiments is intended to be illustrative, and not to limit the scope of the claims. Many alternatives, modifications, and variations will be apparent to those skilled in the art.

What is claimed is:

1. A method for reducing call initiation collisions in a wireless communication system, the method comprising:
   receiving, at a user equipment (UE), a broadcast notification message from an eNodeB, the broadcast notification message comprising information regarding an action type corresponding to each of a plurality of predetermined ranges, the action type is related to sending a call initiation request,
   wherein the action type information comprises a first action type instructing sending the call initiation request to the eNodeB, a second action type indicating waiting a predetermined time duration for sending the call initiation request to the eNodeB, and a third action type indicating an action of changing a frequency for the sending the call initiation request,
   selecting, at the UE, a value randomly in a range of 0 to 1; and
   performing an operation according to the action type corresponding to each of the plurality of predetermined ranges based upon the selected value in the range of 0 to 1 and the broadcast notification message,
   wherein the UE sends the call initiation request to the eNodeB according to the first action type if the selected value in the range of 0 to 1 is smaller than a first threshold value,
   wherein the UE waits a predetermined time duration for sending the call initiation request to the eNodeB according to the second action type if the selected value in the range of 0 to 1 is equal to or more than the first threshold value and smaller than a second threshold value,
   wherein the UE changes a frequency for the sending the call initiation request according to the third action type if the selected value in the range of 0 to 1 is equal to or more than the second threshold value and smaller than or equal to 1, and
   wherein the broadcast notification message is received while the UE is in a radio resource control (RRC) IDLE mode and prior to the UE operation in a RRC CONNECTED mode.

2. The method of claim 1, further comprising:
   perform idle mode handover from the eNodeB to a second eNodeB.

3. The method of claim 1, wherein the call initiation request is an emergency call initiation request.

4. The method of claim 1, wherein the broadcast notification message further comprises device class information, wherein the device class information indicates that UEs which are of a certain class of devices are barred from sending the call initiation request to the eNodeB, wherein if the UE receiving the device class information has a class type identified in the device class information, the UE refrains from sending the call initiation request.

5. The method of claim 4, wherein the broadcast notification message further comprises barring period information, where the barring period information indicates a time period for which the UE having the class type identified in the device class information is to refrain from sending the call initiation request.

6. A user equipment (UE) configured for reducing call initiation collisions in a wireless communication system, the UE comprising:
   a receiver configured to receive a broadcast notification message from an eNodeB, the broadcast notification message comprising information regarding an action type corresponding to each of a plurality of predetermined ranges, the action type is related to sending a call initiation request, wherein the action type information comprises a first action type instructing sending the call initiation request to the eNodeB, a second action type indicating waiting a predetermined time duration for sending the call initiation request to the eNodeB, and a third action type indicating an action of changing a frequency for the sending the call initiation request,
   a processor configured to:
   select, at the UE, a value randomly in range of 0 to 1;
   perform an operation according to the action type corresponding to each of the plurality of predetermined ranges based upon the selected value in the range of 0 to 1 and the broadcast notification message,
   send the call initiation request to the eNodeB according to the first action type if the selected value in the range of 0 to 1 is smaller than a first threshold value,
   wait a predetermined time duration for sending the call initiation request to the eNodeB according to the second action type if the selected value in the range of 0 to 1 is equal to or more than the first threshold value and smaller than a second threshold value,
   change a frequency for the sending the call initiation request according to the third action type if the selected value in the range of 0 to 1 is equal to or more than the second threshold value and smaller than or equal to 1,
   and wherein the broadcast notification message is received while the UE is in a radio resource control (RRC) IDLE mode and prior to the UE operating in a RRC CONNECTED mode.

* * * * *